US008438496B1

(12) United States Patent
Hegde

(10) Patent No.: US 8,438,496 B1
(45) Date of Patent: May 7, 2013

(54) CONTENT SENSITIVE AUTOMATIC SCROLLING

(75) Inventor: Abhishek Naveen Hegde, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1110 days.

(21) Appl. No.: 11/801,516

(22) Filed: May 9, 2007

(51) Int. Cl.
*G06F 3/048* (2006.01)

(52) U.S. Cl.
USPC .......................................... 715/785; 715/784

(58) Field of Classification Search .................. 715/785, 715/786, 784
See application file for complete search history.

(56) References Cited

U.S. PATENT DOCUMENTS

| | | | | | |
|---|---|---|---|---|---|
| 5,495,566 | A | * | 2/1996 | Kwatinetz ...................... | 715/785 |
| 5,850,211 | A | * | 12/1998 | Tognazzini .................... | 345/158 |
| 6,337,694 | B1 | * | 1/2002 | Becker et al. ................. | 345/684 |
| 6,462,752 | B1 | * | 10/2002 | Ma et al. ....................... | 345/684 |
| 6,583,795 | B1 | * | 6/2003 | Ohyama ........................ | 715/785 |
| 6,624,824 | B1 | * | 9/2003 | Tognazzini et al. ........... | 345/684 |
| 6,912,694 | B1 | * | 6/2005 | Harrison et al. ............... | 715/784 |
| 7,024,677 | B1 | * | 4/2006 | Snyder et al. .................... | 725/86 |
| 7,308,653 | B2 | * | 12/2007 | Lin-Hendel .................... | 715/785 |
| 7,322,011 | B2 | * | 1/2008 | Brewer et al. ................. | 715/800 |
| 7,551,188 | B2 | * | 6/2009 | Ahokas .......................... | 345/684 |
| 2002/0027565 | A1 | * | 3/2002 | Syukri ........................... | 345/684 |
| 2008/0252662 | A1 | * | 10/2008 | Hyatt ............................. | 345/660 |

FOREIGN PATENT DOCUMENTS

JP 2005017651 A * 1/2005
WO WO 2007017784 A2 * 2/2007

* cited by examiner

*Primary Examiner* — Omar Abul-Ali
(74) *Attorney, Agent, or Firm* — Schwegman Lundberg Woessner P.A.

(57) ABSTRACT

Tailoring automatic document scrolling to content and properties of the content increases readability of the document for a user. Instead of a user being forced to adjust to variations in content of a document while automatic scrolling proceeds at a constant rate or being forced to interrupt the automatic scrolling, the automatic scrolling shifts scroll speed for content variations. An application that presents a document and allows for automatic scrolling through the document, computes various scroll values for different document content and/or different properties of the same document content.

26 Claims, 12 Drawing Sheets

CONTENT SENSITIVE AUTOMATIC SCROLLING

TECHNICAL FIELD

Embodiments relate generally to the technical field of document navigation and, in one specific example, to automatically navigating a document based on content of the document.

BACKGROUND

The product Adobe Reader 8 includes automatic scrolling functionality. Automatic scrolling advances a user's view of a PDF document at a steady rate, moving vertically down the document. If the user interrupts the automatic scrolling by using the scroll bars to move backward or forward to another point in the document, then automatic scrolling continues from that point. At the end of the PDF document, automatic scrolling stops and does not begin again until the user chooses automatic scrolling again.

BRIEF DESCRIPTION OF THE DRAWINGS

Some embodiments are illustrated by way of example and not limitation in the figures of the accompanying drawings in which.

DETAILED DESCRIPTION

Example methods and systems for content sensitive automatic scrolling are described. In the following description, for purposes of explanation, numerous specific details are set forth in order to provide a thorough understanding of example embodiments. It will be evident, however, to one skilled in the art that the present invention may be practiced without these specific details.

Content sensitive automatic scrolling adjusts scroll speed to accommodate variations in content and/or variations in content properties of a document. An application or system that provides content sensitive automatic scrolling functionality parses and examines a document to determine content of a document and qualitative properties of the content (as opposed to quantitative properties of the content, such as number of words in a document). Examples of qualitative properties of content include presence of an image, presence of a table, presence of a hyperlink, size of an image, resolution of an image, etc. Example of qualitative properties of text content include font size, typeface, and font style. For instance, a document is parsed and examined to determine that the document includes text content of varying sizes and image content. The document is also examined to determine layout of content of the document. For instance, it is determined that a page of the document includes three columns of content in a table. The information about content and qualitative content properties allows for content sensitive automatic scrolling.

Figure 1:
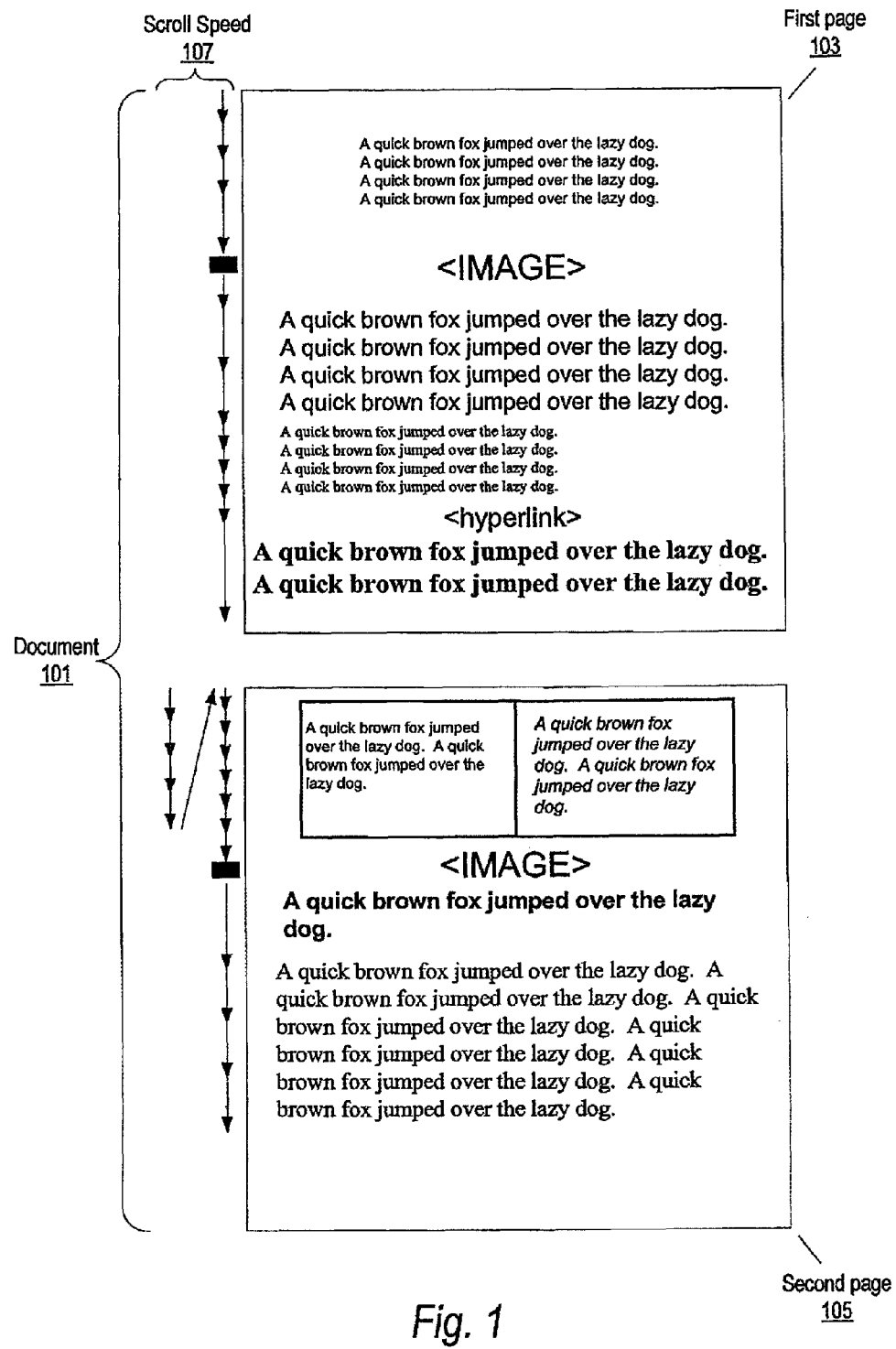
FIG. 1 depicts an example of content sensitive automatic scrolling.

FIG. 1 depicts an example of content sensitive automatic scrolling. A document 101 includes a first page 103 and a second page 105. Both of the pages 103 and 105 include variations in content and variations in content properties. The first page 103 includes text content and non-text content. The non-text content includes an image and a hyperlink. Although this example characterizes a hyperlink as non-text content, embodiments may treat hyperlinks as text content. The text of the first page 103 appears in different font sizes, font styles, and typefaces. Text that precedes the image is displayed as eight point Arial. The two different text parts that appear after the image are displayed serially in 12 point Arial, and 10 point Time New Roman. The text that appears after the hyperlink is displayed as bold, 14 point, Times New Roman.

A series of varying sized arrows 107 flowing vertically adjacent to the first page 103 represent scroll rate. The longer arrows represent faster scroll rates while the shorter arrows represent slower scroll rates. The first set of arrows adjacent to the first text part of the first page 103 represent a first scroll rate. The arrow adjacent to the image in the first page 103 is significantly longer, and represents a substantial increase in scroll speed. This longer arrow is interrupted by a block that represents a pause. The scrolling pauses to provide a user more time to view the image. The scroll speed as represented by the arrows then proceeds at a scroll speed slower than that for the image, but faster than the speed for the first text because the 12 point Arial text is larger than the 8 point Arial text. When the automatic scrolling reaches the 8 point, Times New Roman text, the automatic scrolling slows significantly as represented by the much shorter arrows. Upon encountering the part of the document that has the hyperlink, automatic scrolling slows slightly. Slowing for a hyperlink is not necessary, but for this example it is assumed that a user may desire more time to examine a hyperlink, perhaps placing a cursor over the hyperlink to reveal additional information about the hyperlink. After the hyperlink, the automatic scrolling speeds up significantly for the large 14 point, Times New Roman text.

The second page 105 of the document 101 includes 8 point, Arial text in a first column and 9 point, Arial italicized text in a second column. After the columns, the second page 105 includes an image and then bold, 12 point, Arial text. The last part of the second page 105 includes 12 points, Times New Roman text. As represented by the arrows 107 adjacent to the second page 105, automatic scrolling proceeds at a rate that corresponds to the size of the text in the first column. Upon reaching the end of the first column, automatic scrolling repositions to the top of the columns, and scrolls at a slower rate since the text in the second column is italicized. The slower rate provides a reader with more time to perceive the italicized text. After scrolling through the text in the second column, an image is encountered and the automatic scrolling pauses. After the pause, the automatic scrolling increases scroll rate through the bold, 12 point, Times New Roman text. Automatic scrolling then slightly slows for the regular, 12 point, Times New Roman text.

An implementation of content sensitive automatic scrolling can use a variety of techniques to compute scroll rates and perform particular directives. For instance, the example depicted in FIG. 1 assumes a directive to pause for images. The time for pausing can vary or be pre-defined for images. There may not even be a pause directive for images. In addition, the level of sensitivity to content may vary with embodiments. For example, an embodiment may not make adjustments to scrolling for non-text content. An embodiment may not consider typeface and font style, but focus solely on font size to compute a scroll rate.

Content sensitive automatic scrolling allows a user to read a document smoothly and naturally. The variations in scroll rate provide a reader more time for small text, less time for large text, etc.

Content sensitive automatic scrolling also provides a user with an experience tailored to a particular document and more dynamic presentation. Content sensitive automatic scrolling can tailor to a particular document by computing a variety of scroll rates for a document with heterogeneous content. Content sensitive automatic scrolling can also dynamically present a document by presenting diverse content based on relationships among the content. For example, scrolling continue through embedded audio that ties tightly into the text that follows the representation of the audio at a rate that corresponds to the length and rate of the audio.

Content sensitive automatic scrolling may range from computing different scroll rates based on variations in text size to performing directives for particular content and adjusting scroll rate based on the directives as well as multiple text size properties. This range of possible embodiments for content sensitive automatic scrolling performs parse and examine operations, scroll value computation operations, and the scrolling or redrawing. Content sensitive automatic scrolling parses and examines a document to determine content of a document and properties of the content and the document. For example, parsing and examining a document determines that the document includes text content that is 12 point Arial text and text content that is 10 point, underlined, Arial text.

Figure 2:
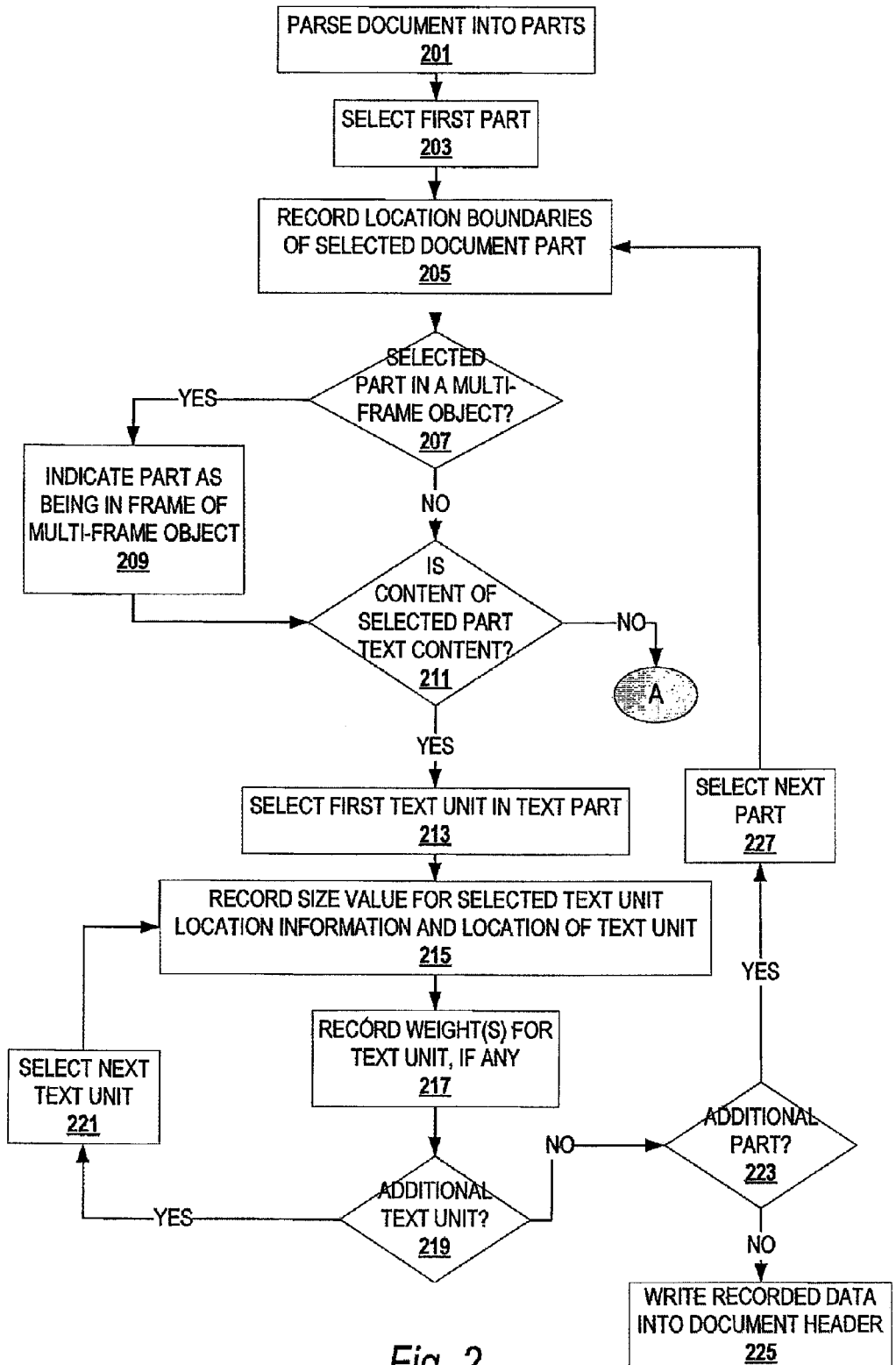
FIG. 2 depicts an example flowchart for parsing and examining a document.
Figure 12:
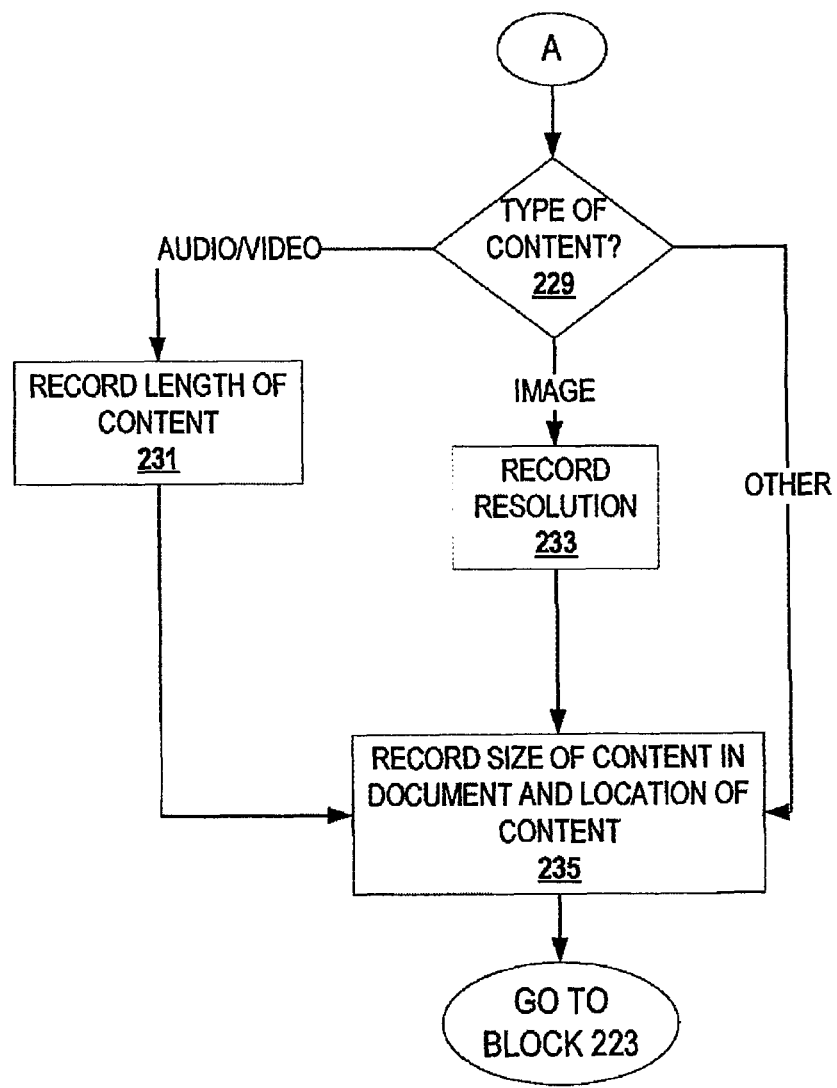
FIG. 12 depicts a remainder of the example flowchart of FIG. 2.

FIGS. 2 and 12 are flowcharts depicting an example method for parsing and examining a document. FIG. 2 depicts an example flowchart for parsing and examining a document. At block 201, a document is parsed into constituent parts. Parsing a document into parts can take on various forms. For instance, document content may be represented as a set of objects. Parsing would parse the document into the objects of the document. In another example, parsing separates text content and different types of non-text content. Parsing may also identify different sections of a document. or just parse the document into pages. With respect to text content, parsing may be performed at a variety of granularities. Text content may be parsed into text units of one of these various granularities (e.g., words, sentences, one or more lines, paragraphs, sections, pixels, etc.), or multiple of the various granularities. For example, parsing may identify a line and words in the line.

At block 203, a first part of the document is selected. At block 205, location boundaries of the first part are recorded. For example, the top left (x, y) coordinates and the bottom right (x, y) coordinates of a line of text are recorded. At block 207, it is determined if the selected part is in a multi-frame object. For instance, it is determined if a selected paragraph of text is in a column of a table. If the selected part is in a multi-frame object, then control flows to block 209. If the selected part is not in a multi-frame object, then control flows to block 211.

At block 209, the selected part is indicated as being in a multi-frame object. Control flows from block 209 to block 211.

At block 211, it is determined if content of the selected part is text content. If the selected part is not text content, then control flows to block 229 of FIG. 12. If the selected part is text content, then control flows to block 213.

At block 213, a first text unit of the selected text part is selected. For example, a first part may be all text of a page prior to an image in the page. The first text unit may be a character, word, line, etc. At block 215, a size value location of the text unit are recorded for the selected text unit. The size value may be ascertained from font size (e.g., pixel height) of a smallest character of a line, font size and font style (e.g., bold, italics, superscript, etc.), most frequent typeface (e.g., Arial, Courier, etc.) of a section, typeface and font size for a line, pitch, etc. For example, pixel height of a character is recorded for a character text unit. In another example, font information (e.g., font style, typeface, font size) is recorded for a word. At block 217, weights for the text unit are recorded, if any. A weight may enhance or reduce size value for a text unit. For example, a size value for a line of text may be reduced if a certain percentage of the words in the line are articles. A size value for a line of text may be enhanced if the line includes a certain number of words with more than 8 characters. At block 219, it is determined if there are additional text units in the selected part of the document. If there are additional text units, then control flows to block 221. If there are no additional text units in the selected part, then control flows to block 223.

At block 221, the next text unit in the selected document part is selected. Control flows from block 221 back to block 215.

At block 223, it is determined if there is an additional document part. If there is an additional document part, then control flows to block 227. If there are no additional document parts, then control flows to block 225.

At block 227, the next document part is selected and control flows back to block 205.

At block 225, recorded data is written into a header of the document. Of course, it is not necessary to write the data into the header of the document at block 225. The data may already be written into the header. The data may be appended to the document as metadata. An embodiment may have recorded the data into a data structure in another file and associate the data structure with the document (e.g., write a reference to the file with the data structure into the document.)

FIG. 12 depicts a remainder of the example flowchart of FIG. 2. At block 229, the type of non-text content is determined. If the non-text content is an image type of content, then control flows to block 233. If the non-text content is audio or video, then control flows to block 231. If the non-text content is another type of content, then control flows to block 235.

At block 231, a length of an audio or video is recorded. Control flows from block 231 to block 235.

At block 233, resolution of the image is recorded. Control flows from block 233 to block 235.

The information recorded for non-text content is not limited to length for audio and video and resolution for image. In fact, an embodiment may only record size and disregard length and resolution. In another embodiment, other information, such as image type (e.g., graph, scene) or quality (e.g., high-quality video/audio versus low-quality video/audio), may be recorded in addition or instead of length or resolution.

At block 235, size of the content and location of the content are recorded. For example, an audio file embedded in the content may be represented by an icon or play bar. The size of the icon or play bar is recorded. Control flows from block 235 to block 223.

In the example operations of the above Figures, the location boundaries of a document part are recorded, as well as location of a text unit or non-text content. These operations assume a document part includes multiple text units or multiple non-text content. If a document part does not include multiple text units or multiple non-text content, then the selected document part and the selected text unit or non-text content may have the same location information. It is not necessary to record the same location information twice.

Figure 3:
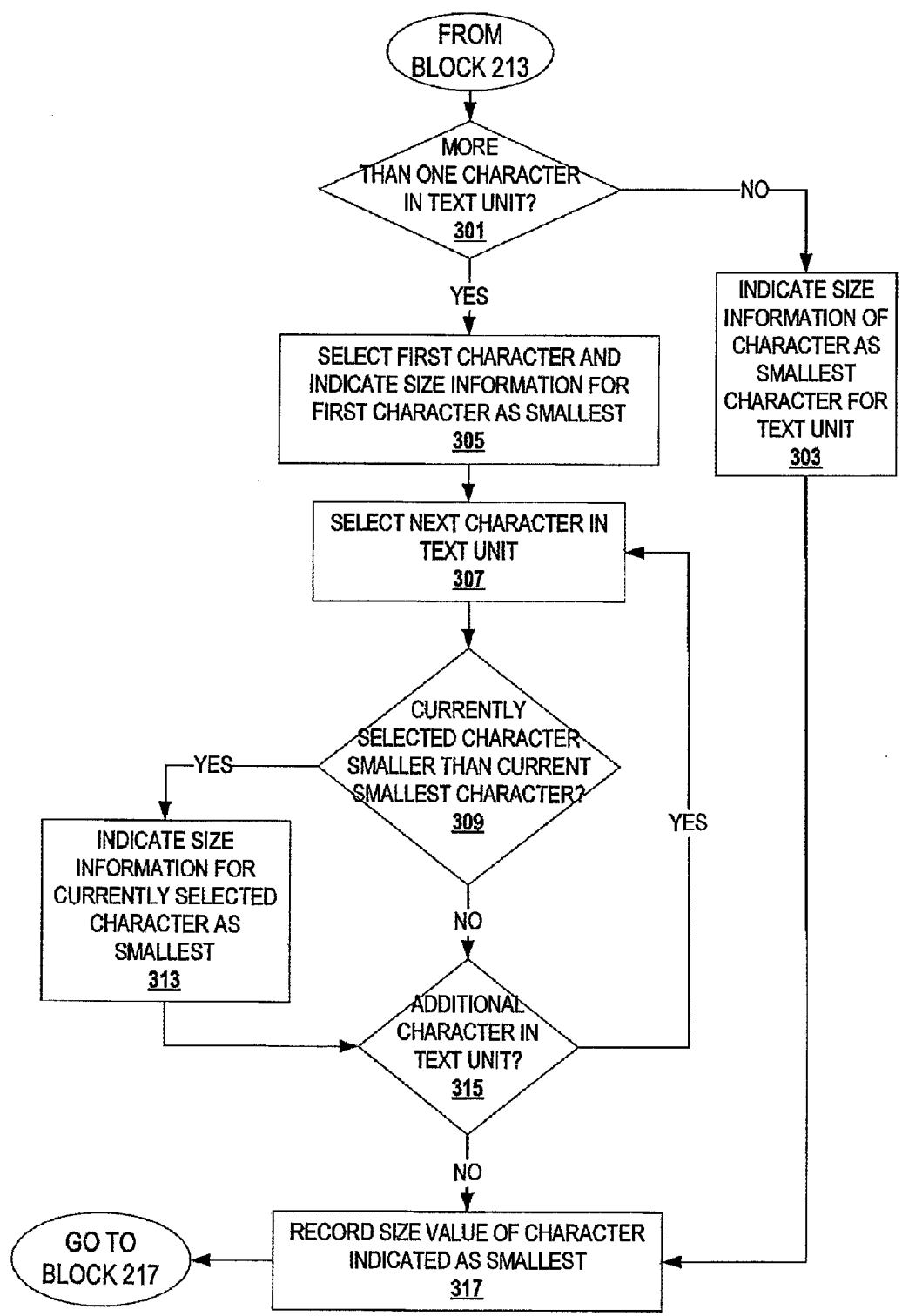
FIG. 3 is a flowchart depicting an example method for computing text size for a text unit based on a smallest character of the text unit.
Figure 4:
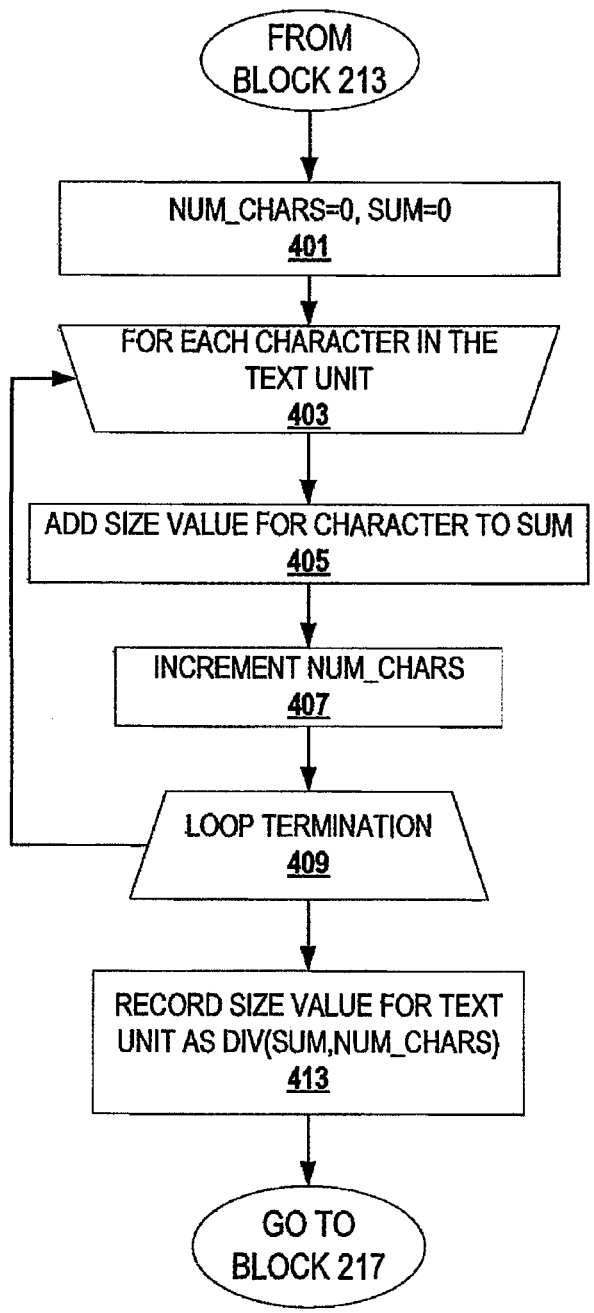
FIG. 4 is a flowchart depicting an example method for computing scroll rate based on an average size value of a text unit.

The example operation depicted in block 215 of the above FIG. 2 records a size value for a text unit. The recorded size value may be ascertained with a variety of techniques. FIGS. 3 and 4 provide just two examples for ascertaining size value for a text unit.

FIG. 3 is a flowchart depicting an example method for computing text size for a text unit based on a smallest character of the text unit. At block 301, it is determined if a selected text unit includes more than one character. If the selected text unit includes more than one character, then control flows to block 305. If the selected text unit does not include more than one character, then control flows to block 303.

At block 303, the size information of the one character in the selected text unit is indicated as the smallest character. Control flows from block 303 to block 317.

At block 305, a first character of the selected text unit is selected. Also at block 305, the size information of the selected first character is indicated as being for the smallest character. At block 307, a next character in the text unit is selected. At block 309, it is determined if the size information of the currently selected character indicates a smaller character than the size information currently indicated as the smallest. For example, pixel heights are compared. If the currently selected character is determined to be smaller, then control flows to block 313. If the currently selected character is not smaller, then control flows to block 315.

At block 313, the size information for the currently selected character is indicated as the smallest for the text unit. At block 315, it is determined if there is an additional character in the selected text unit. If so, then control flows back to block 307. If not, then control flows to block 317. At block 317, the size information indicated as smallest for the text unit is recorded.

FIG. 4 is a flowchart depicting an example method for computing scroll rate based on an average size value of a text unit. At block 401, values that represent a number of characters in a text unit and a sum are initialized. At block 403, a loop begins for each character in a selected text unit. At block 405, a size value for the character is added to the sum. At block 407, the value that represents the number of characters in the selected text unit is incremented. At block 409, the loop ends or returns to block 403. At block 413, a size value for the text unit is recorded as a quotient of the sum and the number of characters in the text unit.

Of course, embodiments are not limited to the examples depicted in FIGS. 3 and 4 for computing scroll values for a document. A variety of techniques can be employed to compute scroll values. A scroll value may be computed from a median of character pixel heights in a text unit. A scroll value may be computed from an algorithm that takes font size, typeface, and font style as parameters or variables. An embodiment may compute scroll rate based on average height of the three smallest characters in a text unit.

Content sensitive automatic scrolling may also consider layout of a document, as well as content. When examining a document, content sensitive automatic scrolling may record information to reflect any multi-frame objects, such as tables and information about the multi-frame objects, such as orientation, columns, rows, etc.

Figure 5:
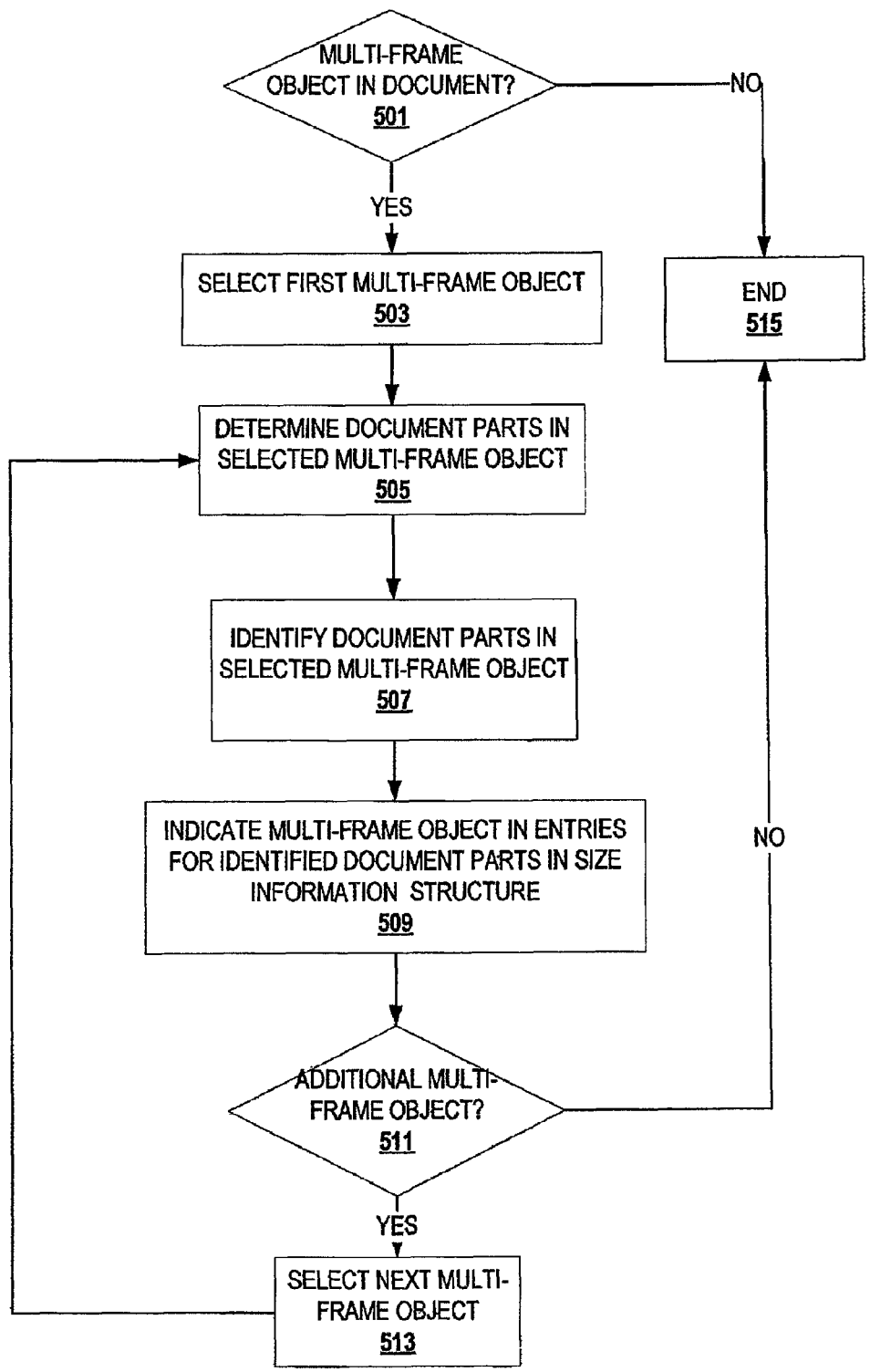
FIG. 5 is a flowchart depicting an example method for recording information about layout of a document for use in content sensitive automatic scrolling.

FIG. 5 is a flowchart depicting an example method for recording information about layout of a document for use in content sensitive automatic scrolling. At block 501, it is determined if a document includes one or more multi-frame objects. If the document includes one or more multi-frame objects, then control flows to block 503. If not, then control flows to block 515. At block 515, the operations end (e.g., recorded values are returned, a null value is returned, etc.).

At block 503, a first multi-frame object is selected. At block 505, the document parts in the selected multi-frame object are determined. At block 507, the determined document parts are identified. For example, parts are identified by location boundaries, tags, etc. At block 509, the selected multi-frame object is indicated in entries in a structure with recorded size information for the selected document parts. For example, a multi-frame object identifier is recorded, location information for the multi-frame object is recorded, and/or a flag is set. At block 511, it is determined if there are additional multi-frame objects in the document. If so, then a next multi-frame object is selected at block 511. Control flows from block 511 to block 505. If there are no additional multi-frame objects, then control flows to block 515.

After recording information about multi-frame objects and content, relationships between documents parts in multi-frame objects may be indicated. For example, one page of the document may have 3 columns of text, and a few pages later, another page may have 4 columns, with text in 3 columns and an image in the fourth column. Entries in a structure for the text content in the three columns are updated to a relationship between those three text parts (e.g., an identifier for the multi-frame object is recorded in each of the entries). Similarly, entries for the text in the 4 column object are updated to reflect their relationship. Of course, these relationships between text areas may be implicitly determined from indication of the columns and the page number. The relationship information may be explicitly recorded for more complex documents. For example, relationship information may be recorded for a page that includes two tables of multi-column text content.

Figure 6:
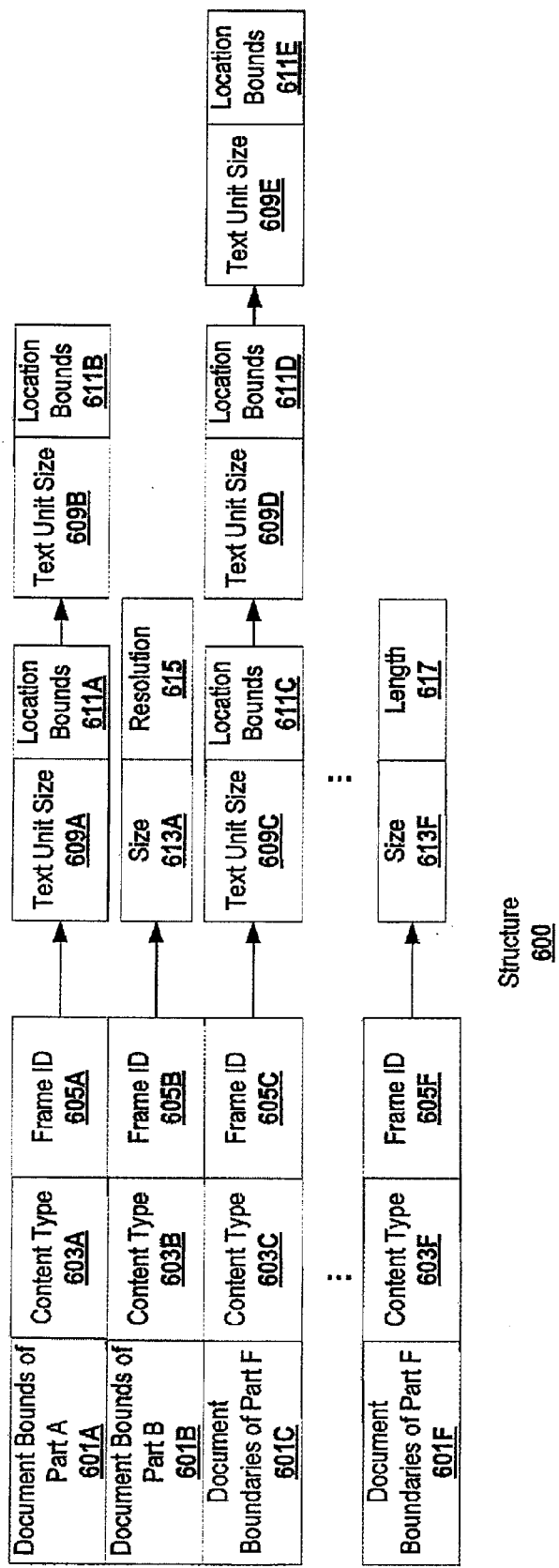
FIG. 6 depicts an example conceptual diagram of a structure that hosts size information for a document.

The information recorded for content sensitive automatic scrolling (e.g., layout information, text size information, etc.) may be recorded in a variety of structures implemented solely in software, solely in hardware, or in both software and hardware. FIG. 6 depicts an example conceptual diagram of a structure that hosts size information for a document. A structure 600 has four entries illustrated. The structure 600 is indexed by document bounds of document parts. A first entry includes a field 601A that indicates documents bounds for a part A of a document, a field 603A that indicates a content type for part A, a frame identifier field 605A to indicate a frame that contains part A (if applicable), and a reference to two text unit structures. The two text unit structures referenced by the first entry respectively include text unit size fields 609A and 609B, and location bounds fields 611A and 611B.

The second, third, and fourth entries include similar fields. Each of the second, third, and fourth entries respectively include fields 603B, 603C, and 603F that respectively indicate document bounds for part B, part C, and part F of a document represented by the structure 600. Each of the second, third, and fourth entries respectively include content type fields 603B, 603C, and 603F. Each of the second, third, and fourth entries respectively include frame identifier fields 605B, 605C, and 605F.

The second entry in the structure 600 represents image content, and references a structure that includes fields 613 and 615. Field 613 indicates a size of the image. Field 615 indicates a resolution of the image. Of course, the illustrated arrangement of fields in FIG. 6 is solely to aid in illustrating this figure and should not be used to limit embodiments.

Similar to the first entry, the third entry references text unit structures. The third entry, however, references list of three text unit structures. The three structures respectively include a text unit size field 609C, a text unit size field 609D, and a text unit size field 609E. The three text unit structure of the third entry also respectively include a location bounds field 611C, a location bounds field 611D, and a location bounds field 611E.

The fourth entry references a structure that includes fields 613F and 617. The field 613F indicates a size of a representation (e.g. icon) for an audio or video in the document. The field 617 indicates a length of the audio/video content.

After a document is parsed and examined, scroll rates for the document are determined based on the information determined from the examination of the document. Scroll rate computation may employ a variety of techniques. Computing scroll rates may involve walking the structure that hosts size information and looking up a speed in a table that maps size information to scroll rates. In addition to size information, type of content may be mapped to particular speeds or directives. For example, image content may map to a pre-scroll pause directive and a first speed while audio content maps to a different speed. Scroll rates may be computed by applying an algorithm to size information. After computing a scroll rate, a weight(s), if any, may be applied to adjust the scroll rate to other factors, such as sentence structure, reading level of content, or subject matter. Computation of scroll rate may also take into account a previous or subsequent scroll rate. For example, differences between scroll rates of adjacent content may be adjusted to normalize the scroll rate and avoid drastic changes. Such adjustments to scroll rates may be implemented by computing scroll rates in multiple passes. For example, scroll rates are looked up in a table in a first pass, adjusted with weights based on reading level of content in a second pass, and normalized in a third pass. In addition, scroll values may be adjusted based on particular hardware being used to display the document. Furthermore, the scroll values may be computed as pixel increments for redraw, offsets from a base, etc.

In an embodiment, parsing and examining may generate a structure that indicates changes in text. For example, entries may only be generated for a location that corresponds to a change in text size. Content sensitive automatic scrolling can scroll at a first scroll rate through several pages that have text of a same size. When a location in a documents is reached where text size changes, a second scroll rate is retrieved and utilized.

Figure 7:
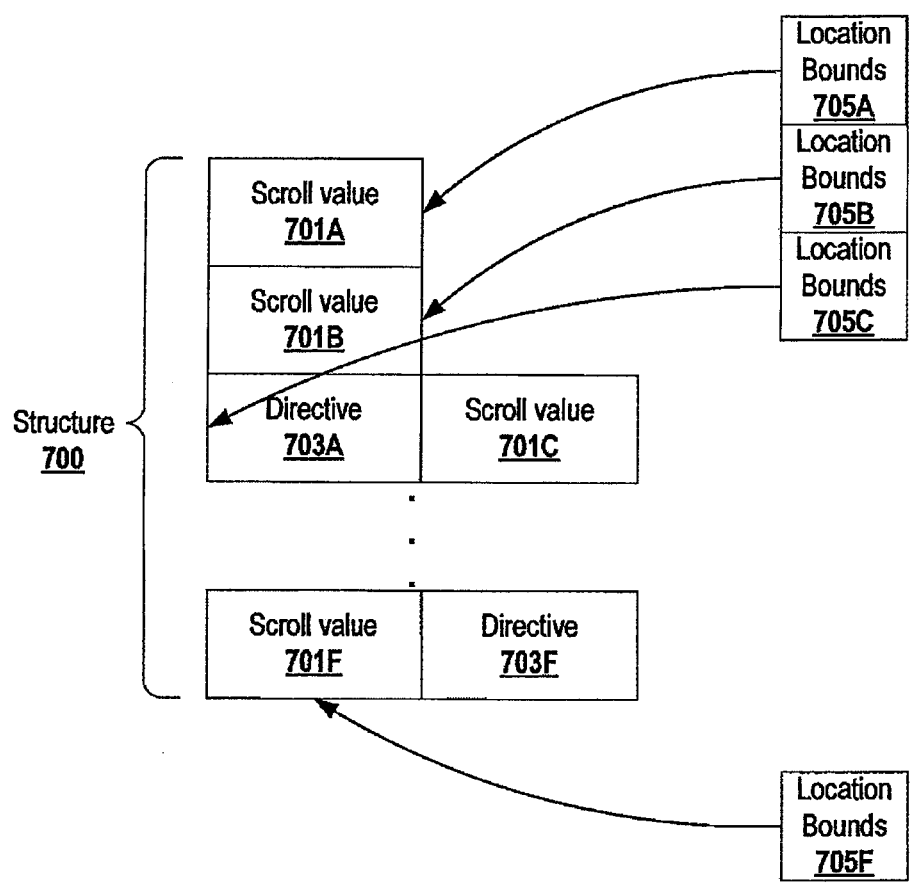
FIG. 7 depicts an example structure for scroll values and directives.

FIG. 7 depicts an example structure for scroll values and directives. A structure 700 includes multiple entries. FIG. 7 illustrates four example entries. The four entries each respectively include scroll value fields 701A, 701B, 70C, and 701F. The scroll values may indicate a redraw increment (e.g., increment 10 pixels, 12 pixels, etc.), a time (e.g., increment 8 pixels and redraw every 1 second, increment 8 pixels and redraw every 0.4 seconds, etc.). The third entry and fourth entries respectively include pre-scroll directive fields 703A and 703B. The directive fields indicate actions to be performed either prior to scrolling through the corresponding content or subsequent to scrolling through the corresponding content. The directive may indicate pause, play video, skip to new location, etc. Each of the entries of the structure 700 are referenced by location bounds fields. The location bounds fields 705A, 705B, 705C, and 705F respectively reference the first, second, third, and fourth entries. While content sensitive automatic scrolling looks up scroll values by walking down the structure 700, an event (e.g., input from a pointing device by a user) may change position of the document. After a change in position from an interrupting event, content sensitive automatic scrolling determines the current location and then finds location bounds field that indicates location bounds that include the current location. The reference from that location bounds field is followed to the appropriate scroll value entry.

The scroll values may be computed subsequent to or in advance of any command or event that initiates automatic scrolling. For example, the scroll values may be written into the document (e.g., into a header), stored in a structure associated with the document (e.g., a reference to the structure is written into the document), etc., prior to any event or command that initiates content sensitive automatic scrolling. For example, size information is retrieved to compute scroll values for a next part of a document while scrolling through the document. An embodiment that computes scroll values after initiation of automatic scrolling may or may not record the scroll values into a structure, such as the example structured illustrated in FIG. 7.

Figure 10:
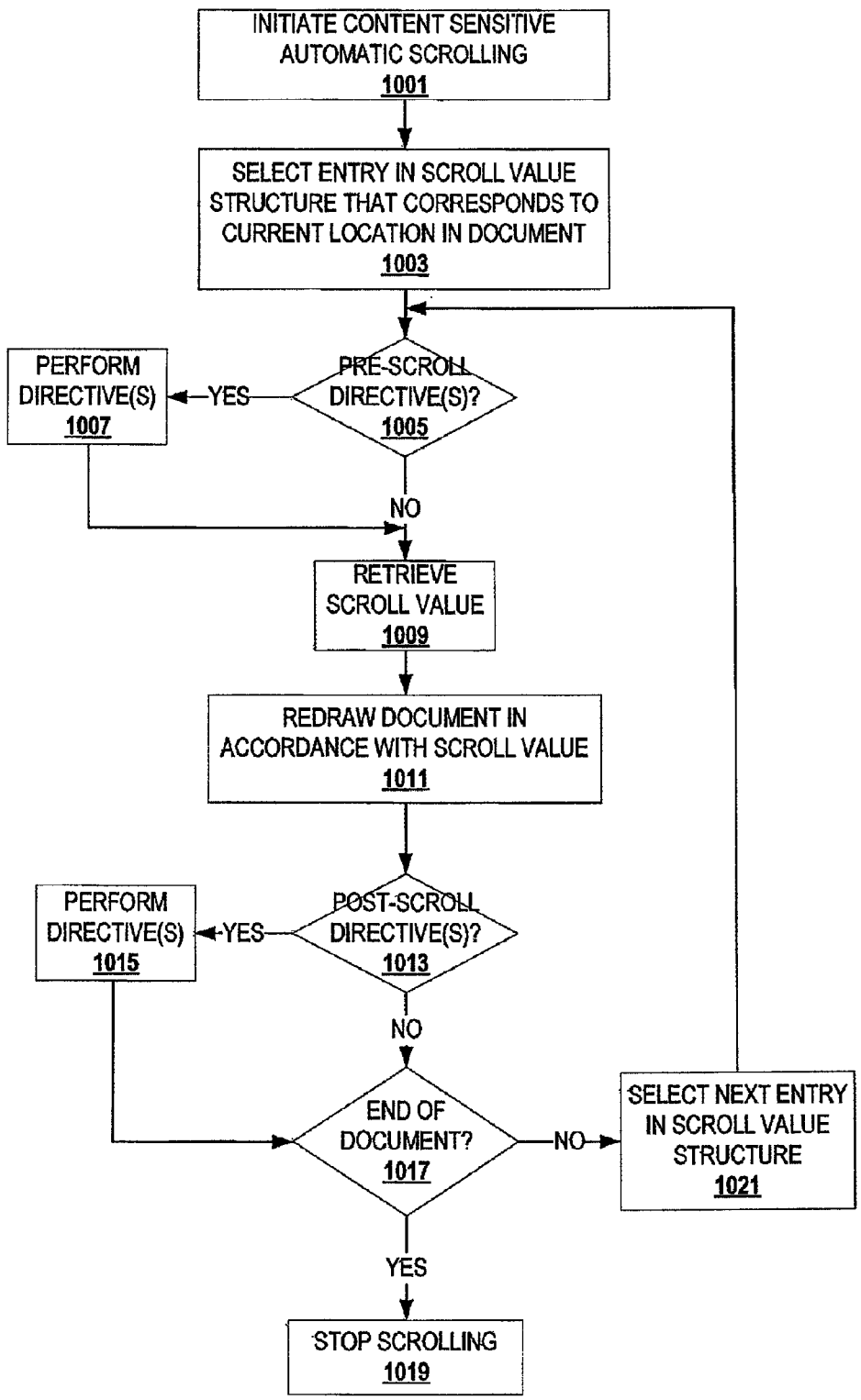
FIG. 10 is a flowchart depicting an example method for reading a structure with scroll values to redraw a document for automatic scrolling.

FIG. 10 is a flowchart depicting an example method for reading a structure with scroll values to redraw a document for automatic scrolling. At block 1001, content sensitive automatic scrolling is initiated. At block 1003, an entry is selected in a scroll value structure is selected that corresponds to a current location in the document. For example, the current location coordinates are compared against entries in a scroll value structure until an entry is found with coordinate boundaries that include the current location coordinates. In another example, a hash of the current location is generated and used as an index into the scroll value structure. At block 1005, it is determined if the selected entry indicates one or more pre-scroll directives. If the selected entry does not, then control flows to block 1009. If the selected entry indicates a pre-scroll directive(s), then control flows to block 1007.

At block 1007, the pre-scroll directive(s) is performed. For instance, content may be in a different orientation. Hence, the pre-scroll directive would cause the document to be redrawn in accordance with the orientation of the content. At block 1009, a scroll value is retrieved from the selected entry. At block 1011, the document is redrawn in accordance with the scroll value. At block 1013, it is determined if the selected entry indicates a post-scroll directive(s). If the selected entry does not, then control flows to block 1017. If the selected entry indicates a post-scroll directive(s), then control flows to block 1015.

At block 1015, the post-scroll directive is performed. For example, the post-scroll directive may cause the document to be redrawn to an original orientation after a pre-scroll directive changed orientation of the document. In another example, automatic scrolling may have scrolled thorough a first column of a table, and the post-scroll directive causes the document to redrawn to reposition to the top of the table. At block 1017, it is determined if the end of the document has been reached. If so, then scrolling stops at block 1019. If not, then control flows to block 1021. At block 1021, the next entry in the scroll value structure is selected.

Figure 8:
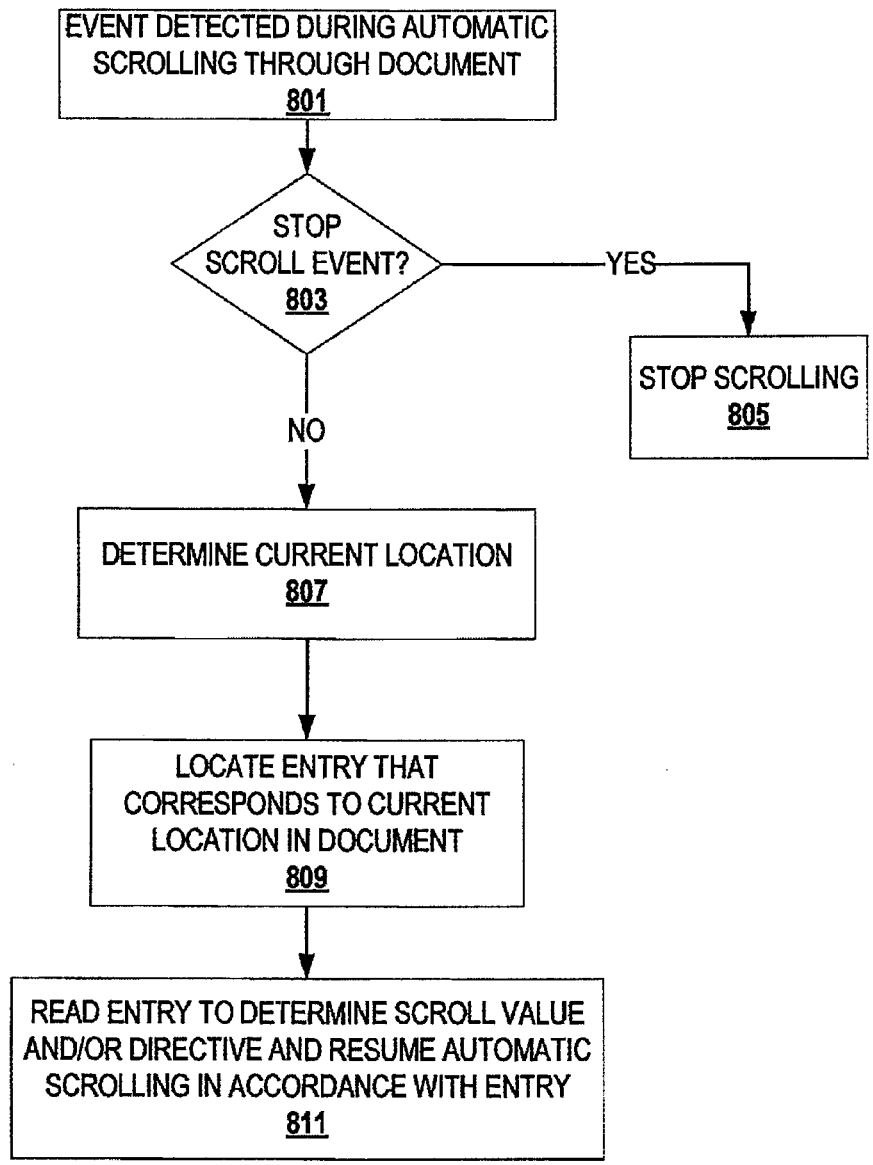
FIG. 8 is a flowchart depicting an example method for handling an event that occurs during automatic scrolling.

During content sensitive automatic scrolling, an event may interrupt the automatic scrolling to reposition or stop scrolling. FIG. 8 is a flowchart depicting an example method for handling an event that occurs during automatic scrolling. At block 801, an event is detected during automatic scrolling through a document. At block 803, it is determined whether the event causes automatic scrolling to stop. If so, then scrolling is stopped at block 805. If not, then control flows to block 807.

At block 807, the current location within the document is determined. At block 809, an entry in a scroll value structure is located that corresponds to the currently determined location. At block 811, the entry is read to determine a scroll value and/or directive and automatic scrolling is resumed in accordance with the read entry.

Figure 9:
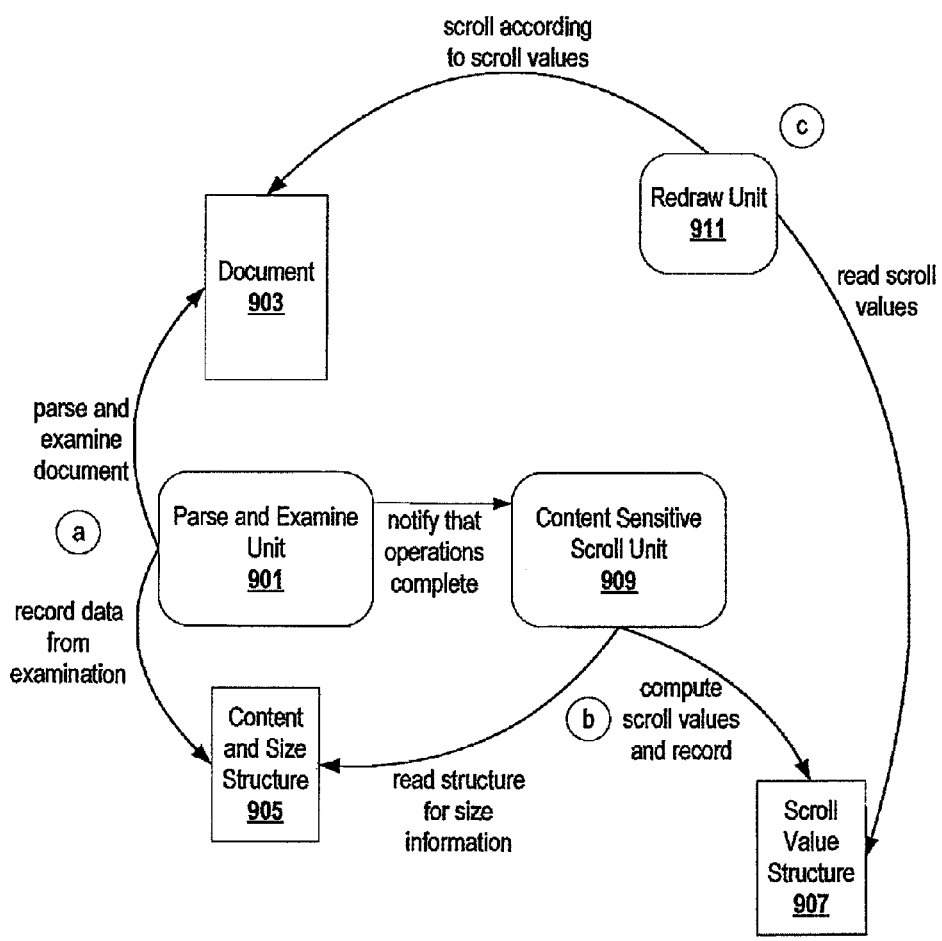
FIG. 9 depicts a conceptual diagram of one example implementation of units for content sensitive automatic scrolling.

Content sensitive scrolling may be implemented in various manners (e.g., performed by one or more processors executing a set of instructions, logic configured to read values from a hardware table, hardware executing instructions and reading values from a hardware table, etc.). When implemented, content sensitive automatic scrolling can be implemented in a number of ways: a single unit may perform all operations, several unit may perform the operations, etc. FIG. 9 depicts a conceptual diagram of one example implementation of units for content sensitive automatic scrolling. In a time period a, a parse and examine unit 901 parses and examines a document 903. The parse and examine unit 901 records data from examination of the document 901 into a content and size structure 905. After parsing and examining completes, the parse and examine unit 901 notifies or invokes a content sensitive scroll unit 909. Of course, the content sensitive scroll unit 909 may be performed after the parse and examine unit 901 completes without a notification or may be invoked by a main unit that includes the parse and examine unit 901 and the content sensitive unit 909. In an embodiment, the content sensitive scroll unit 909 includes the parse and examine unit 901.

In a time period b, the content sensitive scroll unit 909 reads content and size information in the structure 905. With the content and size information, the content sensitive scroll unit 909 computes scroll values and records the computed scroll values into a scroll value structure 907.

At a time period c, a redraw unit 911 reads scroll values from the structure 907. The redraw unit 911 then automatically scrolls through the document 903 based on the scroll values read from the structure 907.

Figure 11:
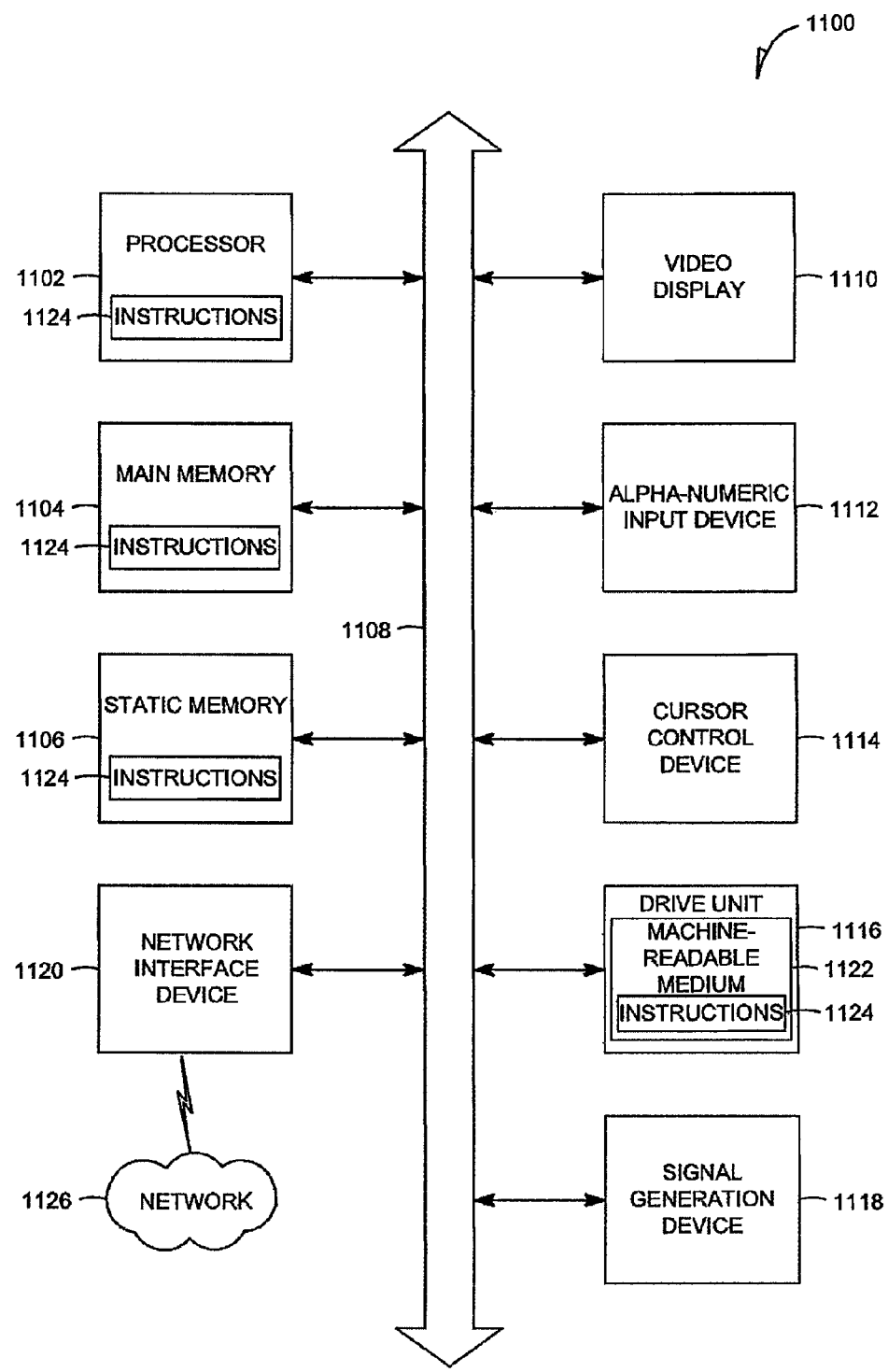
FIG. 11 shows a diagrammatic representation of machine in the example form of a computer system 1100 within which a set of instructions, for causing the machine to perform any one or more of the methodologies discussed herein, may be executed.

FIG. 11 shows a diagrammatic representation of machine in the example form of a computer system 1100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions (e.g., software 1124) embodying any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing a set of instructions for execution by the machine and that cause the machine to perform any one or more of the methodologies of the present invention. The term "machine-readable medium" shall accordingly be taken to include, but not be limited to, solid-state memories and optical and magnetic media.

Tying scroll values to content of a document for automatic scrolling through the document allows an enhanced reading experience for a user. Content sensitive automatic scrolling customizes automatic scrolling to each document. Various document properties individually, and even the document as a whole, drive the automatic scrolling. Automatic scrolling may be sensitive to various sizes of text, images that occur in the document, content layout of each page, etc.

Although the present invention has been described with reference to specific example embodiments, it will be evident that various modifications and changes may be made to these embodiments without departing from the broader spirit and scope of the invention. For instance, embodiments are often described herein with reference to documents, which are typically illustrated with text and images. Embodiments of content sensitive automatic scrolling, however, may also be applied to other types of electronic content, such as audio and video. For example, content sensitive automatic scrolling may analyze audio content, perhaps embedded in a document although not necessarily, and vary speed of the audio based on detected words, pauses between words, syllables in words, number of different sounds, types of different sounds, etc. Video content may be analyzed and speed of playback varied in relation to the qualitative properties of the video. For instance, the playback may increase for sequences that have fewer objects and little to no motion and decrease for sequences that have a greater number of objects and/or greater motion. Accordingly, the specification and drawings are to be regarded in an illustrative rather than a restrictive sense.

What is claimed is:

1. A computer-implemented method of automatically scrolling a document, the method comprising:
   reading a reference that references a file from a number of different files, the reference being written into the document, the different files including data structures indicating various scroll speeds and various directives associated with various qualitative properties;
   reading a data structure included in the file that is referenced by the document, the data structure indicating a scroll speed and a directive associated with a qualitative property of content of the document;
   determining the qualitative property of content of the document;
   automatically determining the scroll speed from the data structure to scroll a display of the document based on the qualitative property; and
   performing the directive when the qualitative property is encountered.

2. The computer-implemented method of claim 1, wherein the qualitative property includes at least one of size of text of the document, presence of an image, and presence of a table.

3. A computer-implemented method of automatically scrolling through a document, the method comprising:
   reading a reference that references a file from a number of different files, the reference being written into the document, the different files including data structures indicating various scroll speeds and various directives associated with various qualitative properties;
   reading a data structure included in the file that is referenced by the document, the data structure indicating different scroll values associated with different sizes of text and different directives associated with different non-text contents;
   parsing and examining the document to determine the different sizes of text in the document and the different non-text contents;
   automatically scrolling through the document at different speeds in accordance with the different sizes of text, the different speeds being based on the different scroll values from the data structure; and
   performing the different directives when the non-text contents are encountered during the automatic scrolling.

4. The computer-implemented method of claim 3, wherein the sizes of the text are based on at least one of font size, font style, and typeface.

5. The computer-implemented method of claim 3, wherein at least one of the different directives indicates at least one of pausing scrolling, relocating in the document, and playing non-text content.

6. The computer-implemented method of claim 3, wherein at least one of the non-text contents comprises at least one of an image, audio, video, and a hyperlink.

7. The computer-implemented method claim 3 further comprising:
   determining layout of the document,
   wherein the automatically scrolling through the document at different speeds is also in accordance with the determined layout of the document.

8. A computer-implemented method of automatically scrolling through a document, the method comprising the acts of:
   reading a reference that references a file from a number of different files, the reference being written into the document, the different files including data structures indicating various scroll speeds and various directives associated with various qualitative properties;
   reading a data structure included in the file that is referenced by the document, the data structure indicating a first scroll rate associated with a first size of text in a first part of the document, a second scroll rate associated with a second size of text in a second part of the document, and a directive associated with a non-text content in a third part of the document;
   automatically scrolling through the first part of the document at the first scroll rate based on the first size of text in the first part of the document; and
   automatically scrolling through the second part of the document at the second scroll rate based on the second size of text in the second part of the document;
   scrolling through the third part of the document that includes the non-text content;
   performing the directive when the non-text content is encountered during the scrolling,
   wherein the first and second scroll rates are different and the first and second text sizes are different.

9. The computer-implemented method of claim 8, wherein the non-text content comprises at least one of image content, audio content, and video content.

10. The computer-implemented method of claim 8, wherein the directive comprises at least one of pausing, changing orientation of the document, and displaying additional information about the non-text content.

11. The computer-implemented method of claim 8, wherein text size is represented by at least one of pixel height, font size, font style, and typeface.

12. The computer-implemented method of claim 8, wherein the first text size corresponds to at least one of a smallest character in the first document part, an average of sizes of characters in the first document part, a median of text sizes of characters in the first document part, and a largest character in the first document part.

13. The computer-implemented method of claim 8, wherein the first and second document parts are within a first and a second frame, respectively, of a multi-frame object.

14. A machine-readable medium having a program product stored thereon, the program product, when executed by one or more processors, to cause the one or more processors to perform operations comprising:
   reading a reference that references a file from a number of different files, the reference being written into a document, the different files including data structures indicating various scroll speeds and various directives associated with various qualitative properties;
   reading a data structure included in the file that is referenced by the document, the data structure indicating different scroll values associated with different sizes of text and different directives associated with different non-text contents;
   parsing and examining the document to determine the different sizes of text in the document and the different non-text contents; and
   automatically scrolling through the document at different speeds in accordance with the different sizes of text, the different speeds being based on the different scroll values;
   performing the different directives when the different non-text contents are encountered during the automatic scrolling.

15. The machine-readable medium of claim 14, wherein the sizes of the text are based on at least one of font size, font style, and typeface.

16. The machine-readable medium of claim 14, wherein the program product, when executed by the one or more processors, further causes the one or more processors to perform operations comprising:

determining content in the document and properties of the content, wherein the automatically scrolling through the document at different speeds is also in accordance with the determined content and content properties.

17. The machine-readable medium of claim 16, wherein the content properties comprise at least one of resolution, length, encoding scheme, and size.

18. The machine-readable medium of claim 15, wherein the program product, when executed by the one or more processors, further causes the one or more processors to perform operations comprising:

determining layout of the document, wherein the automatically scrolling through the document at different speeds is also in accordance with the determined layout of the document.

19. An apparatus comprising:

a redraw unit operable to read a reference that references a file from a number of different files and operable to read a data structure included in the file that is the document, the reference being written into a document, the different files including data structures indicating various scroll speeds and various directives associated with various qualitative properties, the data structure being read indicating different scroll values associated with different sizes of text units and different directives associated with different non-text contents in the document;

a parse and examine unit operable to parse and examine the document to determine the different sizes of the text units in the document and the different non-text contents; and a processor configured by a content sensitive scroll unit to cause automatic scrolling through the document based on the different scroll values in accordance with the different sizes of the text units and operable to (perform the different directives when the different non-text contents are encountered during the automatic scrolling.

20. The apparatus of claim 19 wherein the redraw unit is operable to redraw the document in accordance with the different scroll values.

21. A computer-implemented method, comprising:

determining a qualitative property of content of the document; and automatically determining a scroll speed to scroll a display of the document based on the qualitative property, where differences in the scroll speed are normalized over differing scroll rates of adjacent content in the document by applying a weight to determine the normalized differences in the scroll speed, taking into account a previous scroll rate or a subsequent scroll rate of the adjacent content.

22. The computer-implemented method of claim 21, wherein the automatically determining further comprises:

determining the scroll speed according to at least one directive included in the content and encountered during automatic scrolling.

23. The computer-implemented method of claim 21, wherein the at least one directive comprises a pause that comprises pausing for a selected pause time prior to automatically resuming scrolling the display of the document.

24. The computer-implemented method of claim 21, wherein the automatically determining further comprises:

accessing a scroll value structure corresponding to locations in the document.

25. The computer-implemented method of claim 21, wherein the weight applied is based on a reading level of the content of the document.

26. The computer-implemented method of claim 21, wherein the weight applied is based on a sentence structure of the content of the document.

* * * * *

UNITED STATES PATENT AND TRADEMARK OFFICE
CERTIFICATE OF CORRECTION

| | |
|---|---|
| PATENT NO. | : 8,438,496 B1 |
| APPLICATION NO. | : 11/801516 |
| DATED | : May 7, 2013 |
| INVENTOR(S) | : Abhishek Naveen Hegde |

It is certified that error appears in the above-identified patent and that said Letters Patent is hereby corrected as shown below:

In the Claims

In column 11, line 59, in claim 7, after "method", insert --of--, therefor

In column 14, line 1, in claim 19, delete "(perform" and insert --perform--, therefor Signed and Sealed this
Seventeenth Day of September, 2013

Teresa Stanek Rea
*Deputy Director of the United States Patent and Trademark Office*